3,030,134
ECCENTRIC BEARING JOINT
Albert W. Gair, Fraser, Mich., assignor to Thompson Ramo Wooldridge Inc., a corporation of Ohio
Filed Sept. 20, 1957, Ser. No. 685,224
4 Claims. (Cl. 287—88)

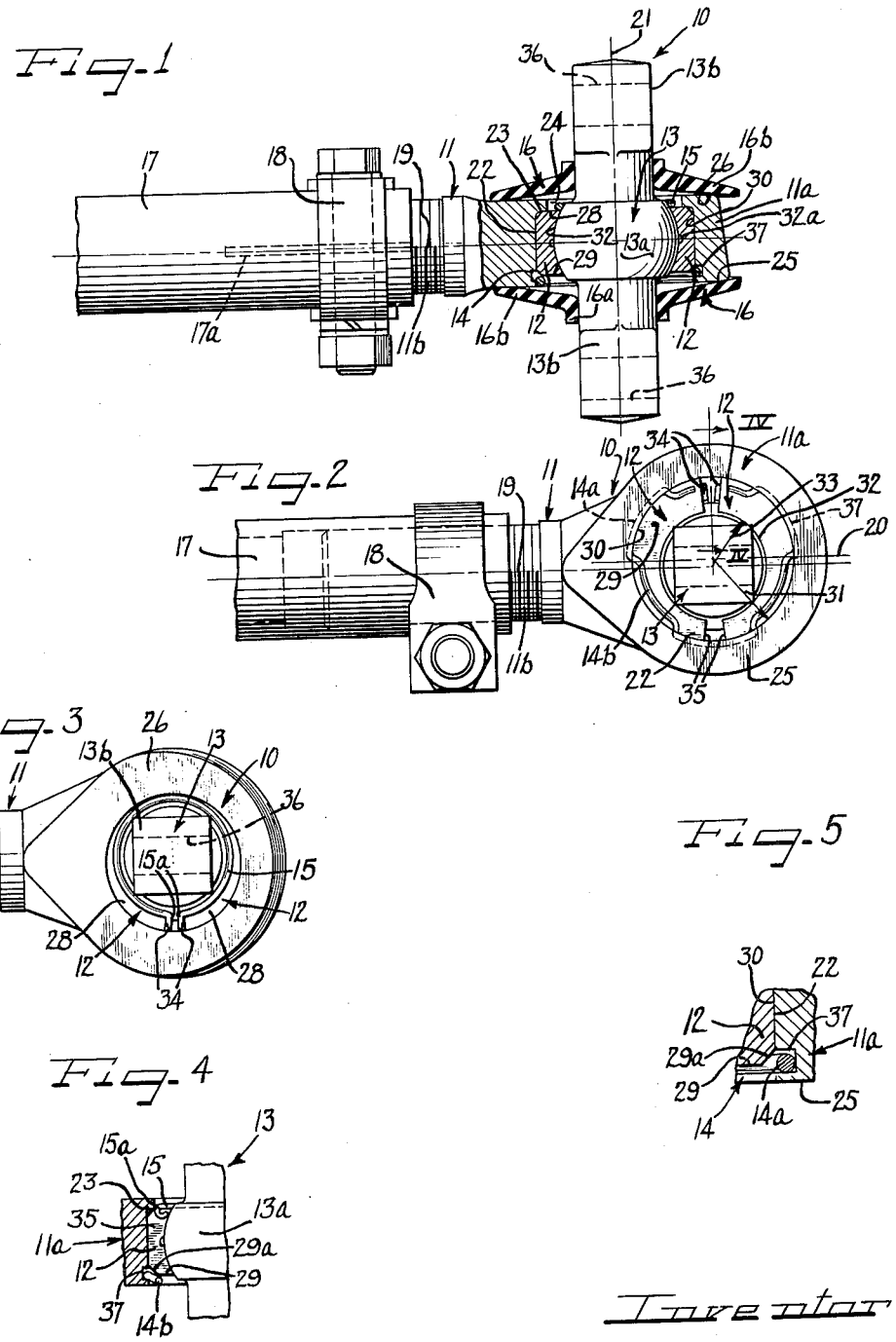

This invention relates to eccentric joints for connecting links such as drag links, tie rods, radius rods and the like wherein eccentric bearing members are urged by one spring means into proper seated relation in a housing and are urged by a second spring means to take up wear developed through usage of the joint. Specifically, this invention deals with a ball joint having an eye-type housing with a projecting stem wherein the axis of the eye is eccentrically displaced from the axis of the stem and the eye mounts a pair of bearings that tiltably and rotatably support a ball stud while an expansion spring urges the bearings circumferentially to tightly seat in the eye and on the ball of the ball stud and a retainer ring holds the bearings in the eye.

According to this invention a forged or cast eye-type socket has an externally threaded stem projecting therefrom with the center of the cylindrical eye chamber eccentrically displaced from the axis of the stem. A pair of bearings having outer semi-cylindrical surfaces slidably fitted in the cylindrical chamber of the eye, are equipped with fragmental spherical inner bearing surfaces that are eccentrically displaced relative to the outer semi-cylindrical surfaces. A ball stud member, preferably having a central ball portion and a pair of shanks projecting from opposite sides thereof, has the ball portion tiltably and rotatably mounted between the bearing members on the fragmental spherical inner surfaces thereof. The studs of the ball stud project freely through the opposite faces of the eye housing. An expansion spring positioned over one end face of the pair of bearings has ears engaging the wide ends of the eccentric bearings to spread these ends apart and thereby rotate the bearings so as to maintain them in tight fitting relation with both the eye housing and the ball of the ball stud. A second spring ring has outer corrugations snapped into a locking groove in the eye housing and inner corrugations underlying the opposite faces of the bearings and urging the bearings against a shoulder in the eye, thereby holding the bearings in the eye. Seal members in the form of rubber cones snugly embrace the shanks of the stud and overlie the opposite faces of the eye to close the assembly.

The invention thus provides a joint assembly of considerable strength having high angular capacity of stud movement, constant wear takeup, and adaptability to a variety of bearing materials such as anti-friction, self-lubricated, plain, and the like, in a standard type of eye socket.

It is then an object of this invention to provide an eccentric bearing joint for connecting links such as drag links, tie rods, radius rods, and the like, wherein a first spring means effects rotation of eccentric bearings to take up wear and a second spring means effects an axial load on the bearings to snugly seat them in a housing.

Another object of this invention is to provide a ball joint having a standard type eye socket supporting a standard type ball stud wherein a pair of eccentric bearings are urged circumferentially in a wear takeup direction by a first spring and are urged axially by a second spring to be detachably held in the housing.

Another object of this invention is to provide an eye type housing with a laterally projecting stem having an axial center displaced from the axis of the eye and a ball stud mounted in the eye on a pair of eccentric bearings which are held in the eye by a snap ring and which are rotated circumferentially by an expansion spring to take up wear developed during use of the joint.

A still further object of this invention is to provide a tie rod joint where circular-type springs hold the joint parts together and take up wear developed during use of the joint parts.

Other and further objects of this invention will be apparent to those skilled in this art from the following detailed description of the annexed sheets of drawings which, by way of a preferred example only, illustrates one embodiment of the invention.

On the drawings:

FIGURE 1 is a side elevational view with parts in vertical cross-section of an eccentric bearing joint and linkage assembly according to this invention.

FIGURE 2 is a bottom plan view of the assembly of FIGURE 1 with the bottom seal removed.

FIGURE 3 is a top plan view of the joint of FIGURE 1 with the top seal removed.

FIGURE 4 is a vertical section along the line IV—IV of FIGURE 2.

FIGURE 5 is an enlarged cross-sectional detailed view of the retainer ring and locking groove.

As shown on the drawings:

The joint assembly 10 of FIGURES 1 to 3 includes a stemmed eye-type housing 11, a pair of eccentric bearing rings 12, 12 in the eye of the housing 11, a double shank ball stud 13 tiltably and rotatably mounted in the bearings 12, 12, a retainer ring 14 in the housing holding the bearings 12, 12 in the eye, an expansion spring 15 urging the bearings 12, 12 circumferentially to take up wear, synthetic plastic cone-type seal discs 16, 16 closing the opposite sides of the eye housing 11, a connecting link 17 threaded on the stem of the eye housing 11, and a clamp ring 18 surrounding the split end of the link 17 to lock the link on the stem.

The housing 11 has a generally cylindrical eye end 11a and a laterally projecting externally threaded stem 11b with a longitudinal axis 19. The eye end 11a is eccentrically offset sidewise from the stem axis 19 and has a central axis 20 as shown in FIGURE 2. In the opposite plane, however, the axis 19 of the stem passes through the center of the eye as shown in FIGURE 1.

The longitudinal axis 21 of the stud 13 passes through the axis 19.

A cylindrical bore 22 centered on the eccentric axis 20 extends inwardly from the bottom face of the eye 11a to an inturned radial shoulder 23 surrounding a circular opening 24 through the opposite face of the eye. The eye end 11a thus has a flat annular bottom face 25 surrounding the bore 22 and a flat annular top face 26 surrounding the opening 24.

The eccentric bearings 12, 12 have flat top and bottom faces 28 and 29, respectively, cylindrical outer walls 30 riding in the cylindrical bore 22 of the eye 11a and struck from a radius 31 centered on the eccentric axis 20. The bearings 12, 12 have fragmental spherical inner bearing surfaces 32 with the major diameter thereof on the transverse center line of the bearings and struck from a radius 33 centered on the stem axis 19. Each inner face 32 has a circumferential grease groove 32a around the major diameter thereof. The bearings 12, 12 are each less than semi-cylindrical and have wide ends 34 and narrow opposite ends 35 each in spaced relation when the rings are disposed around the ball stud 13.

The ball stud 13 has a central ball portion 13a with the major diameter at the transverse center line of the stud and with shanks 13b extending from both sides of the ball. The outer ends of these shanks can have transverse bores 36 therethrough, if desired, to receive straddle mounting means or the like.

The center of the ball 13a is on the axis 19 so that tilting of the stud will always be about this axis and a non-eccentric tilting center is thereby maintained.

If desired, of course, one of the stud shanks 13b can be eliminated and a conventional cantilever-type ball joint provided without departing from the scope of this invention.

As best shown in FIGURES 4 and 5, an undercut groove 37 is provided in the bore 22 of the eye end 11a adjacent the bottom face 25 thereof.

The retainer spring 14 is a split spring ring with alternate outwardly corrugations 14a and inwardly extending corrugations 14b. As illustrated in FIGURE 2, the split end portions of the ring have short inwardly extending corrugations while the closed side of the ring has inwardly extending longer corrugations on opposite sides of the center line through the closed end. The inner corrugations are offset on a lower plane than the outer corrugations. These outer corrugations are snapped into the groove 37 and the inner corrugations then underlie the bottom face 29 of the eccentric bearings 12, 12. A spring action effected by the contraction of the retainer 14 as it is snapped into the groove 37 causes the corrugations 14b to exert an axial thrust on the faces 29 thereby urging the eccentric rings 12, 12 snugly against the shoulder 23 of the eye. The periphery of the bottom face 29 is beveled as shown at 29a to assist in guiding the outer corrugations 14a of the snap ring into the groove 37. These outer corrugations 14a seat in the groove 37 contacting the bottom or outer face of the groove as shown in FIGURE 5. The retainer thus coacts with the housing shoulder 23 to hold the eccentric bearings in the bore 22 against axial movement but accommodates circumferential movement of the rings.

The spring 15 is a split ring with offset ears 15a engaging the large end faces 34 of the eccentric bearings 12 while the main circular body of the spring overlies the top faces 28 of the eccentric rings. The spring 15 is contracted to snap the ears 15a in the space between the large ends of the eccentric bearings 12 and the expansion stress of this spring urges the wide faces 34 of the bearings apart. This exerts a circumferential thrust on the bearings tending to rotate them about the center of the bore 22 of the housing 11a thereby tightening the bearing faces 32 about the ball member 13a and at the same time, tightening the cylindrical outer faces of the eccentric members in the bore. This, of course, takes up any wear developed between the contacting surfaces.

The seal members 16 have central apertures snugly receiving the stud shanks 13b therethrough and thickened boss portions 16a surround these apertures. The seals have conical flanges 16b overlying the end faces 25 and 26, respectively, of the eye 11a in sealing engagement therewith without, however, interfering with free tilting and rotating movements of the stud in its housing.

The connecting link 17 is threaded onto the stem 11b and has a longitudinal slot 17a extending inwardly from the end thereof to accommodate contraction of the link by the clamping ring 18. This clamping ring 18 includes a U-shaped ring member surrounding the link 17 and a locking nut and bolt assembly extended through eyes in the legs of the U to contract the ring tightly around the link and thereby contract the link tightly around the stem 11b to prevent relative rotation of the housing 11 and link 17. To adjust the housing axially of the link the clamp 18 is loosened and the stem is threaded into or out of the link to provide the proper spaced relation between the end of the link and the eye 11a.

The housing member 11 can be forged or cast metal. The bearings 12, 12 can be steel, powdered metal, plastic material, or the like. The retainer spring 14 and the wear takeup spring 15 are composed of spring metal. The stud 13 is composed of steel.

From the above descriptions it should be apparent that this invention provides either a straddle mount double shank ball stud or a single shank cantilever-type ball stud with eccentric bearings that are held in an eye-type housing by a spring retainer ring and are urged in a wear takeup direction by an expansion spring.

It will be understood that variations and modifications may be effected without departing from the scope of the novel concepts of this invention.

I claim as my invention:

1. An eccentric bearing joint which comprises a housing having an eye end and a laterally extending stem, the axis of the stem being offset laterally from the center of the eye, said eye having a cylindrical bore extending inwardly from one end thereof to an inturned shoulder at the other end thereof, said inturned shoulder surrounding a circular opening in said other end of the eye, a ball stud having a central ball portion in said eye and a pair of opposed shanks extending from the ball portion freely through the opposite ends of the eye in spaced relation from the eye, a pair of opposed eccentric bearings having semi-cylindrical outer surfaces seated on the cylindrical wall of said bore together with fragmental spherical inner surfaces receiving said ball in rotatable and tiltable relation, said outer semi-cylindrical surfaces of the bearing members having radii centered on the eccentric axis of the eye, said fragmental spherical inner bearing surfaces of said bearing members having radii centered on the axis of the stem member in the eye, said bearings having wide ends and narrow ends each in spaced opposed relation, said bore of the eye having a groove therein adjacent one face of the eye, a corrugated type retainer ring having outer corrugations snapped in said groove and inner corrugations underlying said bearings to act thereagainst for urging the rings against said shoulder of the eye, a wear takeup spring overlying an end face of the eccentric bearings and having ear portions pressed against the wide ends of the bearings to spread said ends apart and circumferentially rotate the rings into tight seated relation with the bore of the eye and with the ball member, resilient seal discs having central apertures snugly seated on said stud shanks and flanges riding on opposite faces of the eye to close the eye, a split-ended link rod on said stem, and a clamping ring on said link rod locking the link rod to the stem.

2. An eccentric ball joint assembly which comprises a housing having a cylindrical bore therethrough with an inturned shoulder at one end thereof surrounding a circular opening through said end and a laterally projecting stem having its axis spaced from the center axis of the bore, a pair of eccentric segmental bearings rotatably mounted in said bore and forming a stud receiving aperture having its center axis intersecting the axis of said stem, a ball stud having the ball portion thereof tiltable and rotatable in said segmental bearings, said bore of the housing having a groove therein adjacent an end face of the segmental bearings, a retainer ring snapped into said groove and having portions underlying the segmental bearings to hold the bearings in the bore against said shoulder, and a spring urging said segmental bearings circumferentially to tighten the rings in the bore and around the ball member for taking up wear developed during use.

3. An eccentric ball joint which comprises a housing having a cylindrical bore extending inwardly from a first face and terminating at an inturned shoulder adjacent the opposite face and having a laterally projecting stem having its axis spaced from the axis of said bore, said opposite face having an opening of reduced diameter, a ball stud having a shank projecting freely through said opening and a ball portion disposed in said bore, a plurality of eccentric segments rotatably mounted on said bore and having interior bearing faces embracing said ball member and defining a ball stud receiving aperture having its axis intersecting the axis of the stem, a groove in said bore adjacent the first face of the housing, a retainer ring snapped in said groove and having portions underlying the bearing segments in thrusting relation to urge the segments axially in the bore against the shoulder, and spring means urging said segments circumferentially in said bore to tightly engage the bore and the ball portion.

4. A ball and socket joint which comprises a housing having a cylindrical bore with an inturned shoulder at one end and a laterally projecting stem having its axis spaced from the axis of said bore, a pair of eccentric bearings rotatably mounted in said bore against said shoulder defining a stud receiving aperture having its axis intersecting the axis of the stem, a ball stud having a ball portion tiltable and rotatable in said bearings, an expansion ring urging said eccentric bearings circumferentially in said bore around said ball portion to take up wear developed during use of the joint, and a snap ring carried by said housing acting on said bearings to bias the bearings against said shoulder.

References Cited in the file of this patent

UNITED STATES PATENTS

| | | |
|---|---|---|
| 1,803,257 | Hufferd | Apr. 28, 1931 |
| 1,810,093 | Timson | June 16, 1931 |
| 1,853,121 | Flumerfelt | Apr. 12, 1932 |
| 1,959,258 | Zerk | May 15, 1934 |
| 2,350,482 | Venditty | June 6, 1944 |
| 2,641,492 | Flumerfelt | June 9, 1953 |
| 2,710,208 | Ross et al. | June 7, 1955 |
| 2,752,180 | Vogt | June 26, 1956 |
| 2,766,079 | Browne | Oct. 9, 1956 |

FOREIGN PATENTS

| | | |
|---|---|---|
| 801,353 | Germany | July 8, 1949 |
| 920,719 | France | Apr. 16, 1947 |